United States Patent
Saito

[11] Patent Number: 5,912,657
[45] Date of Patent: Jun. 15, 1999

[54] IMAGE DISPLAY DEVICE

[75] Inventor: Akitoshi Saito, Hamamatsu, Japan

[73] Assignee: Yamaha Corporation, Hamamatsu, Japan

[21] Appl. No.: 08/695,308

[22] Filed: Aug. 9, 1996

[30] Foreign Application Priority Data

Sep. 13, 1995 [JP] Japan .................................... 7-235796

[51] Int. Cl.$^6$ .................................................. G09G 5/36
[52] U.S. Cl. ........................................ 345/139; 345/150
[58] Field of Search ................................. 345/139, 150, 345/153, 431, 186

[56] References Cited

U.S. PATENT DOCUMENTS

| | | | |
|---|---|---|---|
| 4,692,217 | 7/1987 | David et al. | 345/139 |
| 4,943,938 | 7/1990 | Aoshima et al. | 345/139 |
| 5,555,353 | 9/1996 | Shibazaki | 345/139 |
| 5,581,376 | 12/1996 | Harrington | 345/431 |

*Primary Examiner*—Matthew Luu
*Attorney, Agent, or Firm*—Pillsbury Madison & Sutro LLP

[57] ABSTRACT

Pixel data of a two-dimensional image of an object to be displayed is prepared by an image depicting circuit 1, and pixel data in a VRAM 2 is updated by the thus prepared pixel data. On the other hand, pixel data for a single screen in the VRAM 2 is read per frame cycle from the VRAM 2, and the read pixel data is supplied to a digital to analog converter section 5 through a display controller 4. Color signals R', G', and B' for actual display are prepared based on color signals R, G, and B of a pixel forming the pixel data as well as on the Z value of the object corresponding to the pixel, and the respective pixels are displayed. The most remote the object is away from a viewpoint, the more different the display colors of the object displayed by a display unit 3 become from the original colors; the display colors gradually become white. As a result, an object remote from the viewpoint can be displayed on a screen so as to be hazy in opal.

20 Claims, 2 Drawing Sheets

IMAGE DISPLAY DEVICE

BACKGROUND OF THE INVENTION

1. Field of the Invention

The present invention relates to an image display device adapted for three-dimensional image display.

2. Related Art

Recent trends in image forming technology for video game machines and the like demand realistic images. In other words, in displaying objects such as a person, a house, and a building on a screen, it is not enough to display them in a manner that one can simply recognize that they are a person, a house, and a building, but it is desired that the objects be displayed in a manner similar to the manner in which they are actually viewed in the physical world. Under these circumstances, various techniques for displaying images with a flavor of reality including three-dimensional display technology have been proposed.

To display images with reality, it is effective to display each of the objects as faithfully as possible. However, no matter how faithfully each of the objects is displayed, there is a limitation in improving reality of the objects. It is unavoidable that there occurs some difference from how the objects are actually seen in the physical world. One factor for causing such difference is the presence of air, dust, and the like. That is, objects in the physical world appeal to human vision through the process in which such objects reflect sunlight that they receive and this reflected light stimulates the retinas of human eyes. Such reflected light reaches the retinas of the human eyes through the air. Since the air contains moisture and dust, the objects in the physical world are seen through human vision more or less different in color than what they really are. In addition, the degree of change in the colors of these objects increases with increasing distance each object moves away from the human eyes. A remote object is seen so as to be hazy in opal. If such sight can be represented faithfully, the depicted image on the display will be realistic. However, there have so far been no display devices that can achieve such image display.

SUMMARY OF THE INVENTION

The present invention has been made in view of the aforementioned circumstances. An object of the invention is therefore to provide an image display device that can display an object to be displayed on a screen in a manner similar to the manner in which the object to be displayed is actually seen in the physical world.

The invention is applied to an image display device for displaying a two-dimensional image that is obtained as viewing an object to be displayed from a predetermined viewpoint based on an image depicting command that expresses a position of the object to be displayed and a position of the object to be displayed in a three-dimensional space.

Such image display device includes: a color signal generating means for generating a color signal expressing a display color of each of the pixels forming the two-dimensional image based on the image depicting command; and a color correcting means for modifying the color signal corresponding to each of the pixels in accordance with a position of a portion within the three-dimensional space, the portion corresponding to the pixel.

According to the invention, the phenomena that objects in the physical world are seen differently depending on the distance of each object from a viewpoint can be expressed on a display screen, so that realistic images can be provided.

DESCRIPTION OF PREFERRED EMBODIMENTS

To further facilitate understanding of the invention, embodiments of the invention will now be described.

These embodiments indicate one mode of embodiment of the invention. That is, the invention is not limited to such mode of embodiment, but may be modified arbitrarily within the technical scope of the invention.

Figure 1:
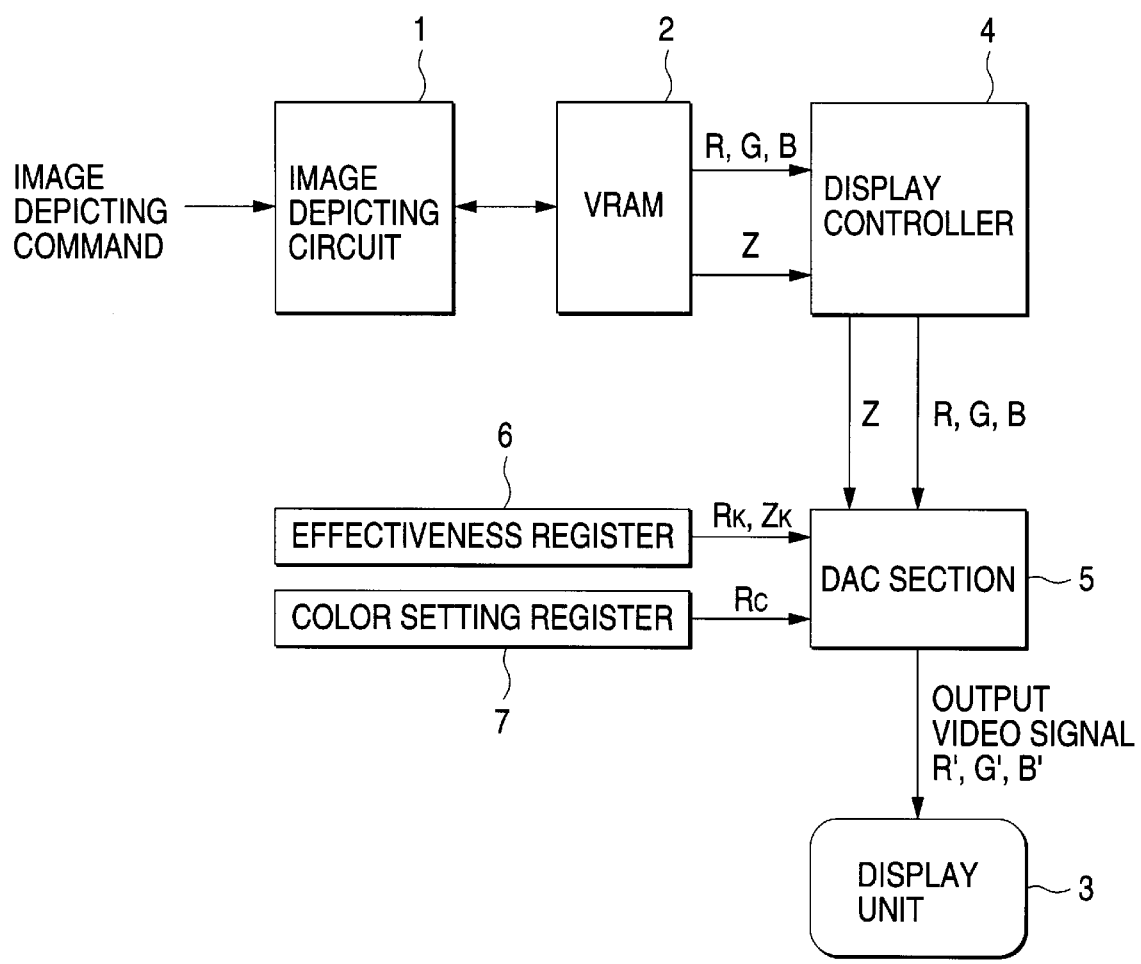
FIG. 1 is a block diagram showing a configuration of an image display device, which is a first embodiment of the invention.

FIG. 1 is a block diagram showing a configuration of an image display device, which is a first embodiment of the invention. This embodiment is characterized as achieving three-dimensional display by means of a Z-buffer method. In FIG. 1, an image depicting circuit 1 generates pixel data necessary for displaying various types of objects in accordance with an image depicting command from a CPU (not shown).

The image depicting command includes data specifying the shape and color of an object to be displayed and three-dimensional coordinates (X, Y, Z) of the object. A viewpoint for viewing the object is located at the origin of the three-dimensional coordinate system. The X-axis indicates a horizontally extending coordinate axis that passes through the origin; the Y-axis is a vertically extending coordinate axis that passes through the origin; and the Z-axis indicates an axis that passes through the origin and that is perpendicular to an X-Y plane.

The image depicting circuit 1 calculates a two-dimensional image obtained in the case where an object to be displayed within a three-dimensional space is projected onto the X-Y plane passing through Z=0 based on the image depicting command such as described above, and prepares pixel data for each of the pixels forming the two-dimensional image. Each of the pixel data consists of a color signal value for three colors R, G, B representing such pixel as well as a Z coordinate value of a portion within the three-dimensional space, the portion corresponding to such pixel.

A VRAM (or video RAM) 2 is a memory for storing the pixel data of the pixels forming a display screen of a display unit 3. More specifically, the VRAM 2 stores a bit map for four screens, i.e., an R plane, a G plane, a B plane, and a Z plane that specify an R value, a G value, a B value, and a Z value for each of the pixels forming a single screen. The image depicting circuit 1 updates the content of each plane within the VRAM 2 using the pixel data when the pixel data of the two-dimensional image of the object to be displayed has been prepared in accordance with the image depicting command. The updating operation is performed by means of the Z-buffer method. That is, the image depicting circuit 1 performs the following operations in sequence for the respective pixels that form the two-dimensional image prepared in accordance with the image depicting command.

a) A Z value corresponding to a pixel of the two-dimensional image prepared in accordance with the image depicting command is compared with a Z value corresponding to the same pixel within the VRAM 2.

b) If the Z value of the prepared pixel is smaller, it is judged that the object corresponding to the prepared pixel is located ahead of the object corresponding to the pixel in the VRAM 2 as viewed from the viewpoint. Therefore, the R, G, B, Z values corresponding to the concerned pixel within the VRAM 2 are updated with the R, G, B, Z values of the concerned pixel prepared in accordance with the image depicting command.

c) If, on the other hand, the Z value of the prepared pixel is larger, then it is judged that the object corresponding to the prepared pixel is located behind the object corresponding to the pixel in the VRAM 2 so as not to be seen. Therefore, the R, G, B, Z values corresponding to the concerned pixel within the VRAM 2 are not updated.

A display controller 4 reads the R plane, the G plane, the B plane, and the Z plane within the VRAM 2 per frame cycle and sequentially supplies to a DAC (Digital to Analog converter) section 5 an R signal, a G signal, a B signal, and a Z signal of each of the pixels forming each plane.

The DAC section 5 performs the operation of modifying the display colors of a pixel based on the position within the three-dimensional space of a portion corresponding to the pixel, and outputs color signals (analog signals) corresponding to the modified display colors. That is, the DAC section 5 converts the R signal, the G signal, the B signal, and the Z signal of each of the pixels supplied through the display controller 4 into analog signals, and outputs to the display unit 3 the color signals (the analog signals) having values R', G', and B' given by the following operation expressions at a built-in analog circuit.

$$R'=(Z/Z_k) \cdot R_k \cdot RC_R \cdot R \quad (1)$$

$$G'=(Z/Z_k) \cdot R_k \cdot RC_G \cdot G \quad (2)$$

$$B'=(Z/Z_k) \cdot R_k \cdot RC_B \cdot B \quad (3)$$

Here, in the aforementioned operation expressions, $Z_k$ and $R_k$ are the coefficients that adjust effectiveness of a change in Z, i.e., the degree of change in a portion common to the respective colors out of a change in a display color corresponding to the change in Z. In addition, $RC_R$, $RC_G$, and $RC_B$ are the coefficients that adjust the degrees of change in the respective colors R, G, B corresponding to the change in Z per color. The coefficient $Z_k$ is determined by the distance from the most remote point that is virtually set in the three-dimensional space. Moreover, the other values $R_k$, $RC_R$, $RC_G$, and $RC_B$ are determined so that color signals R', G', B' corresponding to white can be obtained at the most remote point ($Z=Z_k$). These coefficients are preset by a CPU (not shown), which stores the coefficients $Z_k$ and $R_k$ in an effectiveness register 6 thereof and the coefficients $RC_R$, $RC_G$, and $RC_B$ in a color setting register 7 thereof. These coefficients are then converted into analog signals by the DAC section 5, and supplied to the analog circuit that performs the aforementioned operation expressions.

According to the aforementioned construction, the pixel data of a two-dimensional image of an object to be displayed is prepared by the image depicting circuit 1 in response to an image depicting command, and pixel data in the VRAM 2 is updated by the thus prepared pixel data. On the other hand, the pixel data for each screen within the VRAM 2 is read per frame cycle and the read data is sequentially supplied to the DAC section 5 through the display controller 4. Based on the values of the color signals R, G, and B forming the data of a pixel and the Z value of the object corresponding to such pixel, the color signals R', G', and B' for actual display are prepared and the respective pixels are displayed.

With respect to a pixel corresponding to an object that is close to a viewpoint in the three-dimensional space among the pixels on a display screen, color signals R', G', and B' close to the original color signals R, G, B corresponding to the pixel are outputted from the DAC section 5 since the Z value in the aforementioned operation expressions (1) to (3) is small. As a result, such an object can be displayed at the display unit 3 in colors close to the original colors.

In contrast thereto, with respect to a pixel corresponding to an object remote from a viewpoint in the three-dimensional space among the pixels on a display screen, color signals R', G', and B' that are somewhat different from the original color signals R, G, B corresponding to the pixel are outputted since the Z value in the aforementioned operation expressions (1) to (3) is large. As a result, such an object is displayed by the display unit 3 in colors somewhat different from the original colors. The most remote the object is away from the viewpoint, the greater becomes the difference between a color in which the object is displayed by the display unit 3 and the original color of the object and the whiter becomes the display colors of the pixels representing the object. As a result, the object remote from the viewpoint is displayed on the screen so as to be hazy in opal It may be noted that color correction can be effected at the image depicting circuit 1 and that the corrected color signals can be written to the VRAM 2.

According to this embodiment, an object can be displayed in a manner quite similar to the manner in which the object in the air is seen; i.e., this embodiment can provide a realistic image. In addition, since the degree of effectiveness can be set by the external CPU, a realistic image can be displayed by selection independently of the distance, which in turn provides the advantage that the degree of freedom in image display can be increased.

Figure 2:
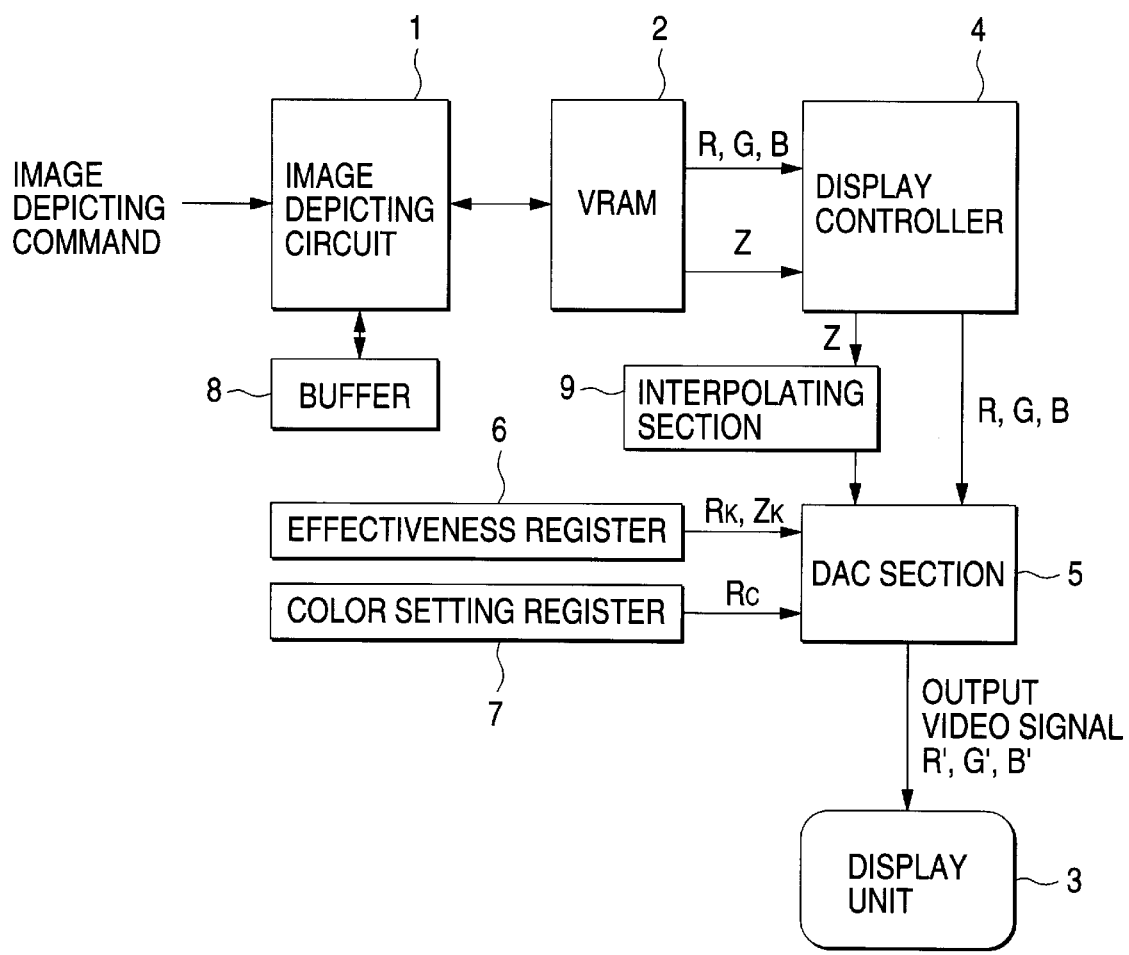
FIG. 2 is a block diagram showing a configuration of an image display device, which is a second embodiment of the invention.

FIG. 2 is a block diagram showing a second embodiment of the invention. The first embodiment is characterized as applying the invention to a three-dimensional display apparatus by the Z-buffer method. On the other hand, the second embodiment shown in FIG. 2 is characterized as applying the invention to a three-dimensional display apparatus by a Z-sort method.

In the Z-sort method, image depicting commands are sorted using a Z value included in each of such commands as a key; the commands are executed in the order of the magnitude of the Z value (i.e., from a depicting command corresponding to an object remoter from a viewpoint); and the pixel data of a two-dimensional image of each object is written to the VRAM 2. In the construction shown in FIG. 2, a buffer 8 for performing the sort operation is connected to the image depicting circuit 1. The image depicting circuit 1 performs the Z-sort operation using the buffer 8 as a work area.

In a generally applied Z-sort method, once the sort operation has been completed, the Z values are discarded. However, in this embodiment, Z values corresponding to the respective pixels are required for use at the time of correcting color signals corresponding to the respective pixels. To meet such a requirement, the Z values included in the image depicting commands are written to the VRAM 2 together with the R, G, B signals at the time of generating the pixel data in accordance with the image depicting commands after the sort operation has been performed and writing the generated pixel data to the VRAM 2. However, the number of bits necessary for calculating the effectiveness of the Z-sort method may be determined by taking into consideration the fact that it is not so meaningful to improve the accuracy of the Z values. That is, the bit configuration for a Z value to be stored in the VRAM 2 may be smaller than the bit configuration for R, G, B signals; i.e., a bit configuration of about 8 to 12 is sufficient.

Further, the Z values may be expressed in logarithm so that Z values in a large area can be handled in association with the bit density for Z values being reduced. Still further, the Z plane in the VRAM 2 may be roughened compared with the other planes R, G, B (e.g., the pixel density may be reduced to about ½). In this case, an interpolating section 9 for interpolating the Z values in a two-dimensional plane and the Z values corresponding to all the pixels can be supplied to the DAC section 5 similarly to the R, G, B signals as shown in FIG. 2. Other aspects of the second embodiment are similar to those of the first embodiment.

As described in the foregoing, the invention is characterized as modifying the display colors of an object to be displayed corresponding to image data based on data indicating a position of such image data within a three-dimensional space. Therefore, phenomena that objects in the physical world are seen differently depending on the distance from a viewpoint can be expressed on a display screen, so that the objects can be displayed on the screen in a manner similar to the manner in which the objects are actually seen in the physical world.

What is claimed is:

1. An image display device for displaying a two-dimensional image that is obtained as viewing an object to be displayed from a predetermined viewpoint based on an image depicting command that expresses a position of the object to be displayed and a position of the object to be displayed in a three-dimensional space, said display device comprising:

a color signal generating means for generating a color signal representing a display color for each pixel of the two-dimensional image based on an image depicting command, said color signal including R, G, and B components; and a color correcting means for modifying degrees of change in the respective color components R, G, and B of said color signal corresponding to each of the pixels based on a position of the object projected onto a pixel within the three-dimensional space.

2. An image display device for displaying objects in a three-dimensional space as a two-dimensional image, said display device comprising:

a color signal generating means for generating a color signal representing a display color of each pixel forming the two-dimensional image based on an image depicting command, said color signal including R, G, and B components; and a color correcting means for modifying degrees of change in the respective color components R, G, and B of said color signal corresponding to each of the pixels based on a position of the object displayed by a pixel within the three-dimensional space, wherein said color signal generating means comprises:
an image depicting circuit receiving an image depicting command;
a video memory coupled to said image depicting circuit; and
a display controller coupled to said video memory, and
wherein said color correcting means comprises:
a digital to analog converter section coupled to said display controller;
an effectiveness register coupled to said digital to analog converter section; and
a color setting register coupled to said digital to analog converter section.

3. The image display device according to claim 2, wherein said image depicting command includes data specifying shape and color of an object to be displayed and three-dimensional coordinates (X, Y, Z) of the object.

4. The image display device according to claim 2, wherein said image depicting circuit calculates a two-dimensional image obtained in a case where an object to be displayed within a three-dimensional space is projected onto the X-Y plane passing through Z=0 based on said image depicting command, and prepares pixel data for each of the pixels forming the two-dimensional image.

5. The image display device according to claim 4, wherein each of the pixel data consists of a color signal value for three colors R, G, B representing such pixel and a Z coordinate value of a portion within the three-dimensional space, the portion corresponding to such pixel.

6. The image display device according to claim 2, wherein said video memory stores the pixel data of the pixels forming a display screen.

7. The image display device according to claim 6, wherein said video memory stores a bit map for an R plane, a G plane, a B plane, and a Z plane that specify an R value, a G value, a B value, and a Z value for each of the pixels forming a single screen, and said image depicting circuit updates content of each plane within said video memory using the pixel data when the pixel data of the two-dimensional image of the object to be displayed has been prepared in accordance with the image depicting command.

8. The image display device according to claim 7, wherein the updating operation is performed by means of the Z-buffer method.

9. The image display device according to claim 7, wherein said display controller reads said R plane, said G plane, said B plane, and said Z plane within said video memory per frame cycle and sequentially supplies to a digital to analog converter section an R signal, a G signal, a B signal, and a Z signal for each of the pixels forming each plane.

10. The image display device according to claim 7, wherein said digital to analog converter section converts the R signal, the G signal, the B signal, and the Z signal for each of the pixels supplied through said display controller into analog signals, and outputs the analog color signals having values R', G', and B' given by the following operation expressions:

$$R' = (Z/Z_k) \cdot R_k \cdot RC_R \cdot R \quad (1);$$

$$G' = (Z/Z_k) \cdot R_k \cdot RC_G \cdot G \quad (2);$$

and $$B' = (Z/Z_k) \cdot R_k \cdot RC_B \cdot B \quad (3),$$

where $Z_k$ and $R_k$ are coefficients that adjust effectiveness of a change in Z, which is the degree of change in a portion common to the respective colors out of a change in a display color corresponding to the change in Z, and $RC_R$, $RC_G$, and $RC_B$ are coefficients that adjust the degree of change in the respective colors R, G, B corresponding to the change in Z per color.

11. The image display device according to claim 10, wherein said coefficient $Z_k$ is determined by the distance from the remotest point that is virtually set in the three-dimensional space, the values $R_k$, $RC_R$, $RC_G$, and $RC_B$ are determined so that color signals R', G', and B' corresponding to white are obtained at the remotest point ($Z=Z_k$).

12. The image display device according to claim 11, wherein said effectiveness register stores therein the coefficients $Z_k$ and $R_k$ and said color setting register stores therein the coefficients $RC_R$, $RC_G$, and $RC_B$.

13. The image display device according to claim 2, further comprising:

a sort buffer coupled to said image depicting circuit; and an interpolating section coupled between said display controller and said digital to analog converter section.

14. The image display device according to claim 2, further comprising a display unit connected to said digital to analog converter section.

15. The image display device according to claim 1, wherein the image depicting command includes three-dimensional position data that represents three-dimensional coordinates (X, Y, Z) of objects to be displayed.

16. The image display device according to claim 15, wherein the color correcting means modifies the color signal based on the depth coordinate (Z) of the three-dimensional position data.

17. An image display device for displaying a two-dimensional image that is obtained as viewing an object to be displayed from a predetermined view point based on an image depicting command that expresses a position of the object to be displayed and a position of the object to be displayed in a three-dimensional space, said display device comprising:

a color signal generation device that receives an image depicting command, which includes color components R, G, and B and three-dimensional position data of objects to be displayed, and that generates a color signal in accordance with the color data, the color signal representing a display color for each pixel of the two-dimensional image; and a color correction device coupled to the color signal generation device, the color correction device modifying degrees of change in the respective color components R, G, and B of the color signal based on the three-dimensional position data and generating a modified color signal.

18. The image display device according to claim 17, further comprising a display unit that receives the modified color signal and displays the two-dimensional image.

19. The image display device according to claim 17, wherein the three-dimensional position data represents three-dimensional coordinates (X, Y, Z).

20. The image display device according to claim 19, wherein the color correction device modifies the color signal based on the depth coordinate (Z) of the three-dimensional position data.

* * * * *